United States Patent [19]
Frankot et al.

[11] Patent Number: 5,495,540
[45] Date of Patent: Feb. 27, 1996

[54] AUTOMATIC SUBAREA SELECTION FOR IMAGE REGISTRATION

[75] Inventors: Robert T. Frankot, Van Nuys; Ralph E. Hudson, Los Angeles, both of Calif.

[73] Assignee: Hughes Aircraft Company, Los Angeles, Calif.

[21] Appl. No.: 322,117

[22] Filed: Oct. 12, 1994

Related U.S. Application Data

[63] Continuation of Ser. No. 17,206, Feb. 8, 1993, abandoned.

[51] Int. Cl.$^6$ ........................................................ G06K 9/32
[52] U.S. Cl. .................................................................. 382/294
[58] Field of Search .................................. 382/44, 46, 27, 382/47, 294, 296, 276, 293, 298, 205, 225

[56] References Cited

U.S. PATENT DOCUMENTS

| | | | |
|---|---|---|---|
| 5,086,346 | 2/1992 | Fujisawa | 382/44 |
| 5,163,100 | 11/1992 | Mathieu et al. | 382/27 |
| 5,175,808 | 12/1992 | Sayre | 382/44 |
| 5,193,126 | 3/1993 | Matsuki | 382/44 |

*Primary Examiner*—Joseph Mancuso
*Attorney, Agent, or Firm*—Leonard A. Alkov; W. K. Denson-Low

[57] ABSTRACT

A method for automatically selecting subareas from reference image data such that registration accuracy is optimized between images. Optimal subarea selection reduces the on-line computation and reference data storage required for multi-subarea correlation or, alteratively, improves its effectiveness. Example results for a synthetic aperture radar (SAR) image are described. The results indicate that the automatic subarea selection method of the present invention reduces on-line computation by a factor of 2 to 3 (relative to random subarea selection) without degradation in accuracy. The present selection method minimizes the predicted total mean squared registration error (MSE). The total MSE is predicted in terms of the position and predicted measurement covariance (derived from local image statistics) of each candidate subarea. Combinatorial optimization procedures select a predetermined number of subareas to minimize total MSE. The present method jointly considers the quality and position for each local measurement, optimally handles any order polynomial model, and includes bounds on the uncertainty of registration parameters.

15 Claims, 5 Drawing Sheets

AUTOMATIC SUBAREA SELECTION FOR IMAGE REGISTRATION

This is a continuation application Ser. No. 08/017,206, filed Feb. 8, 1993, now abandoned.

BACKGROUND

The present invention relates generally to image processing, and more particularly, to automatic subarea selection methods for use in registering images.

In the prior an, selection of image subareas is based on scalar measures of "edge density" or "entropy", such as is described in a paper entitled "Spatial Registration of Multispectral Video Imagery" by Anuta, published in *SPIE J.*, Vol. 7, pp. 168– 175, September 1969. In conventional practice, there is no systematic way of considering subarea position and its impact on registration accuracy. No general method is provided to limit the uncertainty of registration parameters. No general method is provided for handling complementary measurements because measurement quality indicators are based on scalar quantities.

Accordingly, it is an objective of the present invention to provide methods for use in registering images, and in particular, automatic subarea selection methods that improve image registration between related images.

SUMMARY OF THE INVENTION

The present invention is a computer implemented method for automatically selecting subareas from a reference image, such as a SAR image, for example, such that registration accuracy is optimized between a current image and the reference image. Optimal subarea selection reduces on-line computation and reference data storage required for registration effectiveness. The present method minimizes a cost function, corresponding to the predicted total mean squared registration error (MSE), between the images. The total MSE is predicted in terms of position and predicted measurement covariance of each candidate subarea. The measurement covariance for each subarea is predicted from local image statistics. Combinatorial optimization procedures select a predetermined number of subareas to minimize total MSE. The use of error prediction techniques and the associated method for synthesizing optimal sets of subareas have not been used in conventional image registration methods.

The selection criteria includes a vector quality (accuracy) metric for each subarea. It is important to include a vector measure of subarea quality, a covariance matrix rather than a scalar quality measure, to appropriately handle measurements that are of good quality, say, in x but not in y. The covariance matrix defines an error ellipse associated with a given measurement. Previous subarea selection approaches have used scalar indications of local measurement quality. The Anuta method referenced in the Background section uses a measure of edge density to select subareas for image registration.

The selection criteria includes subarea position (jointly with subarea accuracy). For any transformation more general than pure translation, scale factor (magnification) or rotation for example, registration effectiveness depends on the relative positions of each measurement in addition to the accuracy of the measurements themselves. For example, moderately accurate measurements adequately dispersed in the image produce better results than highly accurate measurements clustered in one corner of the image. The present method jointly considers subarea layout and covariance and therefore can distinguish between these cases. It can even handle the situation where the addition of a near-degenerate but well-positioned measurement is more effective than the addition of a highly accurate but poorly-positioned measurement. The selection criteria adapts to registration error model order. Also, the selection criteria adapts to relative uncertainty in registration error parameters.

Experiments performed using the present invention indicate that the method reduces on-line computation by a factor of 2 to 3 without loss of accuracy. The present method considers the direction of measurement errors in addition to their magnitude so that multiple locally-degenerate measurements can be selected if they, together, yield a full-rank result (complementary measurements). It explicitly considers the effect of subarea (measurement) position and weighs this against the intrinsic accuracy of the measurement. It systematically includes the prior uncertainty into the selection process, preventing any parameter from wrongly dominating the selection process. Also, it provides a general method for balancing the competing requirements of different registration parameter, for example, translation versus scale.

Thus, the present invention provides improvements over existing image registration methods proposed to support change detection and other multiple image analysis applications. The advantages provided by the present invention are most significant for larger fields-of-view resulting in higher order correction requirements. The present invention may be adapted for use with military reconnaissance, attack, and counter-stealth applications, and commercial remote sensing and mapping applications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
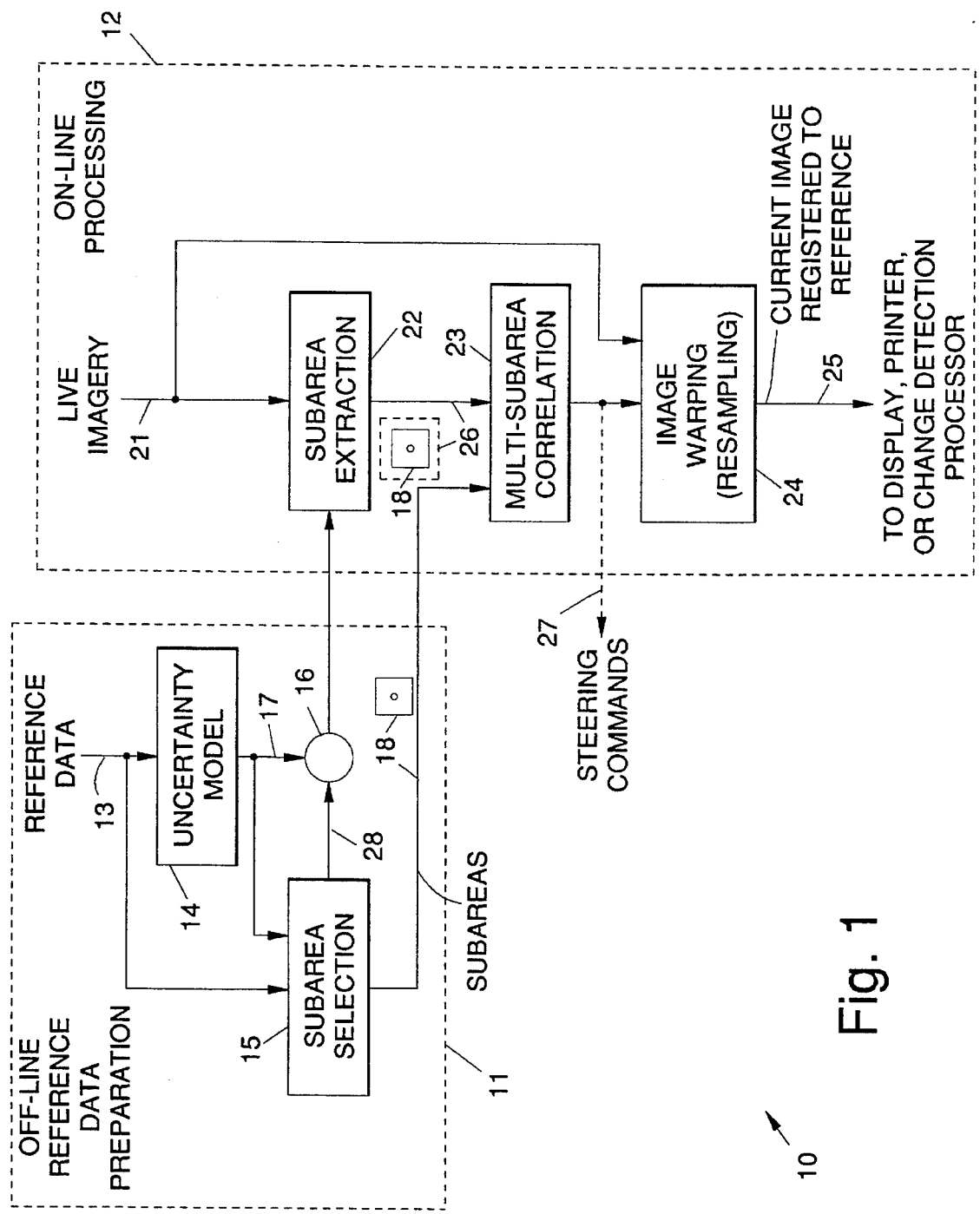
FIG. 1 shows an image processing system employing an image registration method in accordance with the principles of the present invention.

FIG. 1 shows an image processing system 10 employing an image registration method 11 in accordance with the principles of the present invention. The image registration method 11 operates off-line, and on reference (image) data that is typically stored in memory, such as a hard disk, for example. The reference data may be calibrated or uncalibrated image data. The image registration method 11 is comprised of an uncertainty model 14 and a subarea selection procedure 15. A more detailed description of the image registration method 11 is provided below with reference to FIG. 2. The uncertainty model 14 determines the relative uncertainty in locating the actual position of an area of interest that is used in image registration of live imagery. The subarea selection procedure 15 provides as its output selected subareas 18 (position data) of the reference image that have been determined to be optimal in registering the image. The uncertainty data is combined with position data and is applied to an on-line processor 12 of the system 10.

The on-line processor 12 operates on live imagery 21. The live imagery 21 is processed by a subarea extraction procedure 22 which uses a "window" derived from the uncertainty data from the uncertainty model 14 and the position data from the subarea selection procedure 15. The window (shown as a dashed box around the selected subarea 18) comprises the image data that has been extracted by the subarea extraction procedure 22. The selected subareas 18 and the extracted subareas 26 are then correlated by a multi-subarea correlation procedure 23. The output of the multi-subarea correlation procedure 23 is applied to an image warping (resampling) procedure 24 along with the live imagery 21 which registers a current image to the reference image. Alternatively, and as is shown by the dashed arrow identified as steering commands 26, the output of the multi-subarea correlation procedure 23 may be directly used as inputs to a guidance system, for example, that are used to guide a vehicle. The registered current image is then output 25 to a display, printer or change detection procedure, for example.

Figure 2:
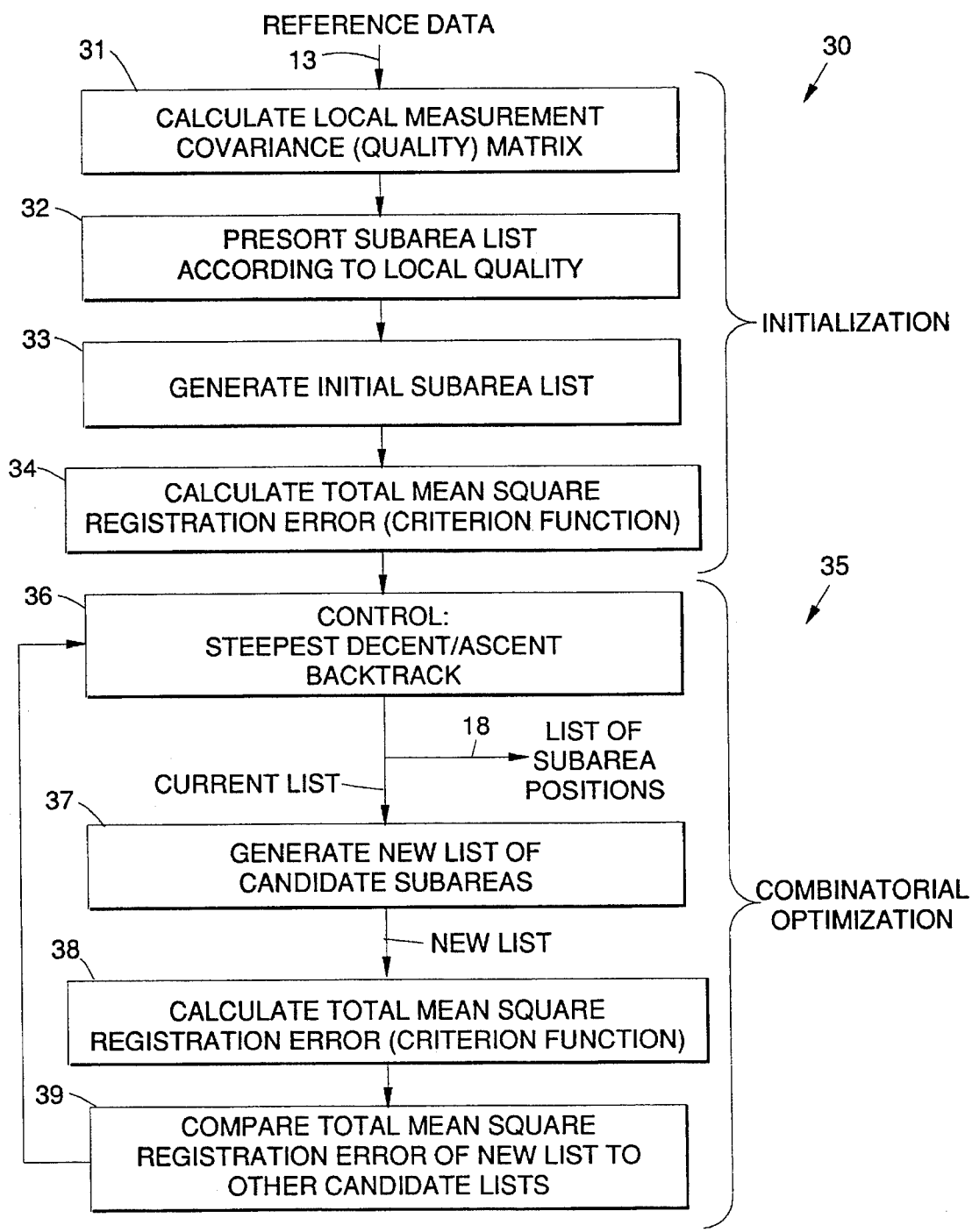
FIG. 2 shows a flow diagram of the image registration method of the present invention.

A detailed flow diagram of the image registration method 11 in accordance with the principles of the present invention is shown in FIG. 2. The image registration method 11 comprises an initialization procedure 30 and a combinatorial optimization procedure 35.

By way of summary, in the initialization procedure 30, a covariance matrix 31 for each candidate subarea (i.e. candidate local measurement) is predicted. Given this matrix 31 and the positions of candidate subareas 18 selected from the computed matrices by the subarea selection procedure 15, the covariance of a distortion model parameter vector (A) is predicted to produce the covariance matrix 31. The covariance of the distortion model parameter vector A comprises the covariance of polynomial error coefficients, wherein covariance propagation weights are derived from a polynomial error model order and an image size parameter. For polynomial distortion models, this covariance is independent of A and is therefore computed from the reference image 13 alone without actually estimating A.

The final criterion for optimization is the predicted sum comprising the calculation of a local mean squared registration error (MSE) 39 for each pixel in the image. This is obtained by propagating the covariance of A through to each pixel using the distortion model. Computation of the total MSE objectively scales the different covariance terms according to their impact on registration accuracy at the pixel level, avoiding any need for ad hoc scaling of parameter covariance terms. A combinatorial optimization procedure searches for the combination of subareas which results in the lowest MSE calculation. The output of this optimization process is a list of subarea positions.

To synthesize an optimal set of subareas, the impact on total MSE of each candidate subarea 18 is calculated. The impact of eliminating a given subarea generally depends on the other candidate subareas 18, and hence a combinatorial optimization scheme is used to synthesize the best subset.

Two procedures are described below that comprise the image registration method 11. The first starts with a maximal set of subareas and eliminates those that minimize the increase in total MSE. The second starts with a minimal set of subareas and then adds the subareas that maximize the reduction of total MSE. The second method has been reduced to practice and compared against selection based on minimizing the MSE of local measurements alone and also a random selection of subareas.

The control structure for a subarea selection or extraction procedure 22 employed in the the image registration method 11 is the combinatorial optimization procedure 35. Prior subarea selection methods have not used combinatorial optimization. Data initialization 30 takes place prior to the combinatorial optimization procedure 35.

Referring to FIG. 2, the first step in the subarea selection method 15 is to calculate a local measurement quality (covariance) matrix 31. The input of this process is the reference image 13, denoted by $I_1$, the output is a 2-by-2 matrix for each candidate subarea 18 indicating position uncertainty (e.g. covariance matrix) or accuracy (e.g. the inverse covariance, or information matrix). The inverse covariance $C_i^{-1}$, referred to as the information matrix 31, is computed directly from local image statistics, namely second moments of the spatial gradient of the image. The computation is shown in detail in equations (7) through (10) below.

The next step is to presort the subarea list 32 according to local quality. This function takes all subareas for which the information matrix 31 has been calculated and then sorts the list in decreasing order of information (quality) or in increasing order of MSE (accuracy). This is a scalar quantity for each subarea and does not take into account interaction with other subareas. The output of this process is an ordered list of subarea positions and information matrices 31. For example, the subareas may be presorted in increasing order of local MSE given by the trace (sum of diagonal elements) of the covariance matrix $$\text{tr}(\hat{C}_i) \qquad (1)$$

The next step is to generate an initial subarea list 33. The input to this process is the ordered list from the presorting step. This step selects the best K subareas to provide the best initial list based on local scalar criteria. Because the list 33 is sorted, the list 33 is comprised of the first K entries. The output is a set of K pointers which specify the index of each initial subarea in the full ordered list 33.

A control procedure 36 for the combinatorial optimization procedure 35 determines which subareas to add and/or delete from a current list in order to form a new list, it compares the total MSE for the current subarea list with that of the new list, and it determines whether the stopping criterion has been met, i.e. whether to continue searching for a better combination of subareas. Two realizations of this control procedure 37, namely steepest descent and steepest ascent are described below. Given these two methods, the application of a more complicated combinatorial optimization scheme, namely backtrack programming, is routine to those skilled in the art.

The next step is to generate new list of candidate subareas 37. This step creates a new list of subareas by adding or deleting $K_{inc}$ temporary candidate subareas from the current list. It starts with the candidate additions/deletions with the best local MSE and continues down the list each time it is invoked.

The next step is to calculate total MSE 38 (optimization criterion). The input to this step is the new list of candidate subareas 37. The output is the total MSE, whose calculation is specified below.

The final step is to compare total MSE values 39. This step evaluates total MSE for each new list of candidate subareas 19. This allows the control process to decide which new list to accept.

Figure 3:
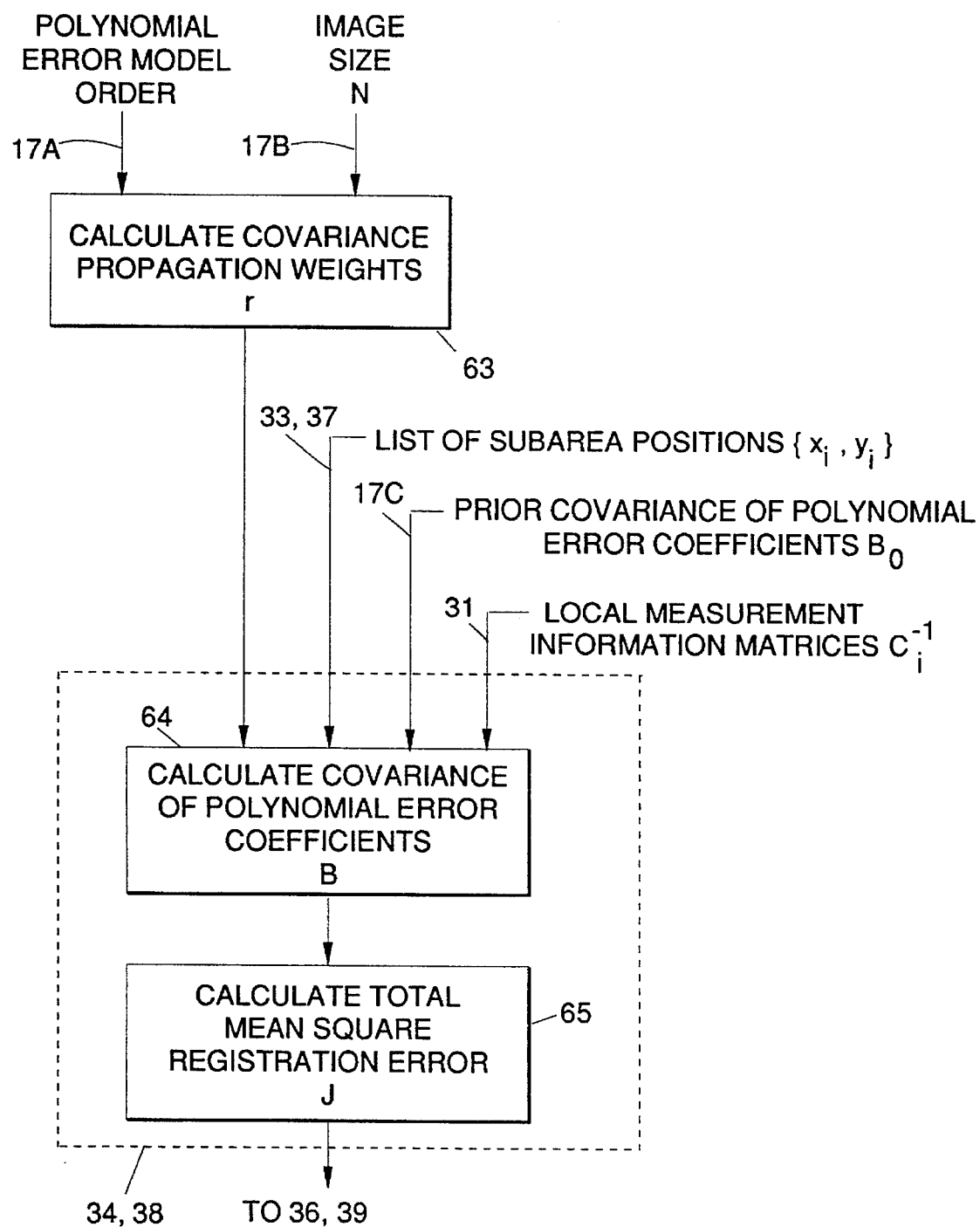
FIG. 3 shows a flow diagram illustrating the calculation of the total mean square registration error performed in the image registration method of FIG. 2.

The heart of the combinatorial optimization procedure 35 is the optimization criterion, namely total MSE 38. Referring to FIG. 3, it shows a flow diagram illustrating the calculation of the total mean square registration error performed in the image registration procedure 35 of FIG. 2. The inputs to the calculation of the total mean square registration error procedure 38 are comprised of the list of subarea positions 18, the local information matrix 31 (or covariance) associated with each subarea 18, the prior covariance of the polynomial coefficients 17C, and image size 17B.

Polynomial error model order 17A. The preferred implementation is a set of binary flags that indicate which polynomial coefficients are zero (or known a priori) and which are nonzero (or unknown) would be estimated by subsequent image registration processing. This model helps determine the mapping from local MSE to total MSE 38.

Prior covariance of the polynomial coefficients 17C. The prior covariance is a matrix $B_0$ which indicates the uncertainty in polynomial error model coefficients prior to application of the image registration procedure. This is similar to the polynomial error model flags but it includes the degree of uncertainty, instead of just a binary indicator. For example, in a second order polynomial model, one might know from operational limits on viewing geometry that the uncertainty in the quadratic terms are much smaller than that of all lower order terms. One can prevent the criterion function (equation (17) below) from being inappropriately dominated by the effects of the quadratic terms by specifying the relative degree of uncertainty using $B_0$.

Calculation of covariance propagation weights 63. The inputs to this process are the polynomial error model order 61 and the image size 62. The calculations may be performed off-line given these inputs. The covariance propagation weights 63, denoted by $r_{jk}$, for the jkth polynomial term, determine the mapping 65 from the covariance of polynomial coefficients 64 to total MSE 34, 38. The weights 63 are calculated by summing central moments of image coordinates over the entire image. The combination of moments used are determined from the polynomial model order 61. The calculation method is detailed in equations (22) through (35) below.

Calculate covariance of polynomial coefficients 64. The inputs to this procedure include the information matrix 31 for each candidate subarea 18 and all of the polynomial terms $x_i^l y_i^m$ corresponding to the position of the center ($x_i$, $y_i$) of each candidate subarea 18. The output B is the expected covariance matrix 64 for the polynomial error coefficients. These polynomial coefficients are to be estimated by a subsequent image registration procedure 12. The covariance matrix 64 indicates how accurate those coefficients are expected to be. Details of the calculation are shown in equations (11) through (15) below. A modified calculation which incorporates the a priori covariance $B_0$ is specified in equation (37) below.

Calculate total mean square registration error 65. The inputs to this process are the covariance propagation weights $r_{jk}$ and the covariance of polynomial coefficients B. This functions maps the covariance matrix 34 to a scalar quantity (total MSE) through a linear combination. The rationale and method are shown in equations (16) through (21).

Optimization criterion calculation. Image registration requires estimation of the coordinate transformation f that aligns two images. Assume that the two images can be modeled as follows:

$$I_1(\underline{x}) = I(\underline{x}) + n_1(\underline{x}) \tag{2}$$

and $$I_2(\underline{x}) = I(f(\underline{x})) + n_2(\underline{x}), \tag{3}$$

where the function I represents the repeatable, or noise-free, component of the images and $n_1$ and $n_2$ are observation noise processes that are independent of I. The total MSE criterion to be minimized is an estimate of $$J = \sum_{\underline{x} \in \Omega} E(\underline{f} - \hat{\underline{f}})^2 \tag{4}$$

where $\Omega$ is the entire image, E denotes an ensemble average, and $\hat{\underline{f}}$ is the estimate of $\underline{f}$ obtained given the selected set of subareas 18.

For the formulation that follows, assume the coordinate transformation $\hat{\underline{f}}$ is estimated by first "measuring" its value $\underline{x}'_i$ at several points $\underline{x}_i$, in the image and then fitting a model to those measurements using a weighted-least-squares method. This method minimizes the weighted sum of squared residuals (or local measurement errors) given by $$\underline{\epsilon}_i = f(\underline{x}_i) - \underline{x}'_i. \tag{5}$$

Finally, assume that $\underline{x}'_i$ is estimated by maximizing the following cross-correlation function $$g(\underline{x}_i, \underline{x}'_i) = \sum_{\underline{\tau} \in \Omega_i} I_1(\underline{x}_i) I_2(\underline{x}'_i + \underline{\tau}) \tag{6}$$

where $\Omega_i$ is some window around $\underline{x}_i$.

Estimating the measurement information matrix. Then, the first step in predicting MSE is to estimate the quality of each local measurement. Let $C_i$ be the 2 by 2 covariance matrix for the ith measurement (subarea). The inverse covariance $C_i^{-1}$, referred to as the information matrix, is used and is computed directly from local image statistics. For convenience, that development is summarized below.

An estimate of the measurement information matrix is given by $$C_i^{-1} = \hat{D}_i (2\hat{\sigma}_i^2 \hat{D}_i + A_w b \hat{\sigma}_n^4 I)^{-1} \hat{D}_i, \tag{7}$$

where $\hat{\sigma}_n$ is an estimate of the standard deviation of the additive noise (assumed equal for $n_1$ and $n_2$), $\hat{D}_i$ is the Hessian term with respect to $x'_i$ of the noise-free part of $g_i$, $A_w$ is the integral of the correlation window, I is the identity matrix, and b<2. This estimation is easily accomplished during the process of correlating $I_1$ and $I_2$ using a finite difference approximation to the derivatives of the cross-correlation function. However, additional assumptions are required in performing this estimation if only one image $I_1$ is observed, as is desired for off-line automatic subarea selection.

Indirect calculation of the Hessian term. Given a single image, a reasonable estimate of the Hessian term is given by $$\hat{D} = \begin{pmatrix} w * [I_i^x]^2 & w * I_i^x I_i^y \\ w * I_i^x I_i^y & w * [I_i^y]^2 \end{pmatrix} - A_w E \begin{pmatrix} [n_i^x]^2 & n_i^x n_i^y \\ n_i^x n_i^y & [n_i^y]^2 \end{pmatrix} \tag{8}$$

where the second term compensates for an unknown bias due to the noise covariance in $I_i^x$ and $I_i^y$, w is the correlation window, * denotes convolution in $\underline{x}=(x,y)$, and the superscript $^{(x)}$ denotes the derivative with respect to x.

Assume that $n_1$ is nearly white, and that the partial derivatives in (8) are approximated using central differences as follows:

$$I_i^x(x,y) = \frac{1}{2}(I_1(x+1,y) - I_1(x-1,y)) \tag{9}$$

and similarly for $I_i^y$. Then the noise terms from $I_i^x$ and $I_i^y$ are approximately uncorrelated, yielding:

$$\hat{D} = \begin{pmatrix} w*[I_i^x]^2 & w*I_i^xI_i^y \\ w*I_i^xI_i^y & w*[I_i^y]^2 \end{pmatrix} - A_w b \hat{\sigma}_n^2 I \tag{10}$$

The noise variance $\sigma_n^2$ is more difficult to estimate. For single-look SAR imagery, for example, the a priori value $\sigma_{n0} = 5.57$ dB may be used. For multi-look SAR imagery obtained by filtering and downsampling higher resolution imagery, the image noise bandwidth should be accounted for in calculating the variance of the multi-look pixels. For other sensors, it is more desirable to estimate the noise bias from the data using order statistics taken on the terms $w*[I_i^x]^2$ and $w*[I_i^y]^2$.

For spatially separable w, the convolutions may be performed separately, requiring computation proportional to the linear width of w instead of the area of w. For uniform windows, the convolutions may be performed recursively with computation proportional to the image size. Depending on the mechanization of the synthesis procedure and on system architecture, the most efficient computational approach is to evaluate (10) only at the centers of candidate subareas 18.

Figure 4:
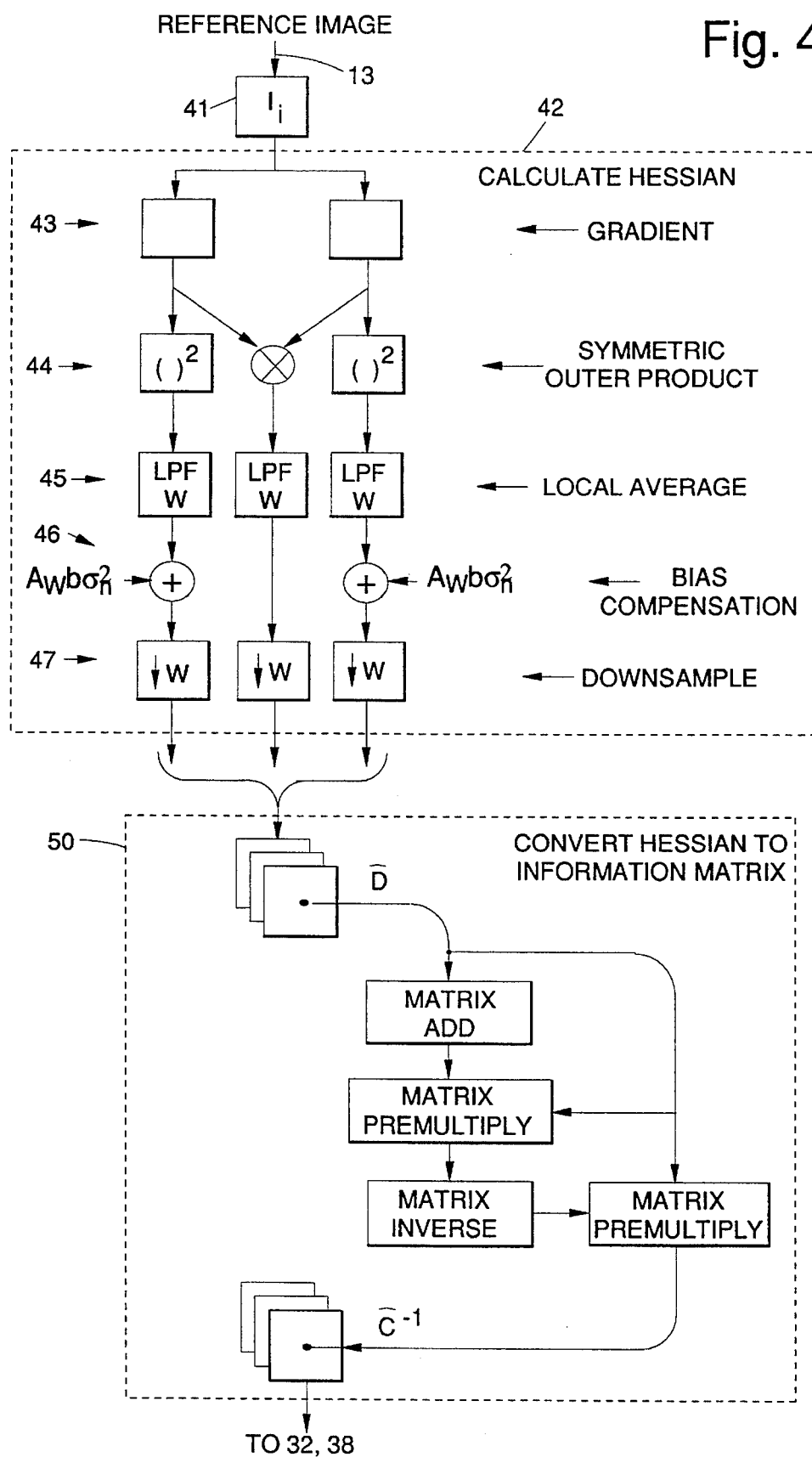
FIG. 4 shows a flow diagram illustrating the calculation of the information matrix performed in the image registration method of FIG. 2.

FIG. 4 shows a flow diagram illustrating the calculation of the information matrix 31 performed in the image registration method 11 of FIG. 2. The procedure for calculating the measurement information matrix 31 is as follows. Calculate derivative images $I_i^x$ and $I_i^y$, step 41. Calculate or look up b and $A_w$, Estimate $\sigma_n$, step 43. For each Hessian term: (a) calculate product of derivatives, e.g. $[I_i^x]^2$, step 44, (b) filter the product with window w, step 45, and (c) downsample by W/2, step 47, where W is the equivalent width of w. For each point in downsampled Hessian images: (a) convert the Hessian term to information matrix using equation (7), step 50.

Estimating parameter covariance. Let $\underline{A}$ denote the vector of registration parameters that define a particular realization of the transformation $\underline{f}$ and $\hat{A}$ denote its weighted-least-squares estimate given measurements obtained from a set S of selected subareas. The covariance of $\hat{A}$ is known given S and each $\hat{C}_i^{-1}$ and may be predicted using the estimates $\hat{C}_i^{-1}$.

For compactness, let $$B = \text{cov}\hat{A}, \tag{11}$$

and define the following column vectors $$\underline{X} = \text{col}(\underline{x}_i, i \in S) \tag{12}$$

where each $\underline{x}_i$ denotes the centroid of the image subarea used in obtaining the ith measurement, and $$F = \text{col}(\underline{f}(\underline{x}_i), i \in S), \tag{13}$$

and let the block diagonal measurement covariance matrix be given by $$\hat{C} = \text{diag}(\hat{C}_i, i \in S). \tag{14}$$

Then, $$B = (\nabla \underline{F}^T C_i^{-1} \underline{F})^{-1} = (\nabla \underline{f}(\underline{x}_i)^T C_i^{-1} \nabla \underline{f}(\underline{x}_i))^{-1} \tag{15}$$

where $\nabla$ is the gradient with respect to $\underline{A}$ and $()^T$ denotes matrix transposition.

Optimization criterion. The objective is to select the set S of subareas 18 such that the following optimization criterion is minimized:

$$J(S,\underline{A}) = \sum_{\underline{x} \in \epsilon} \text{trace}\{\text{cov}(\underline{f}(\underline{x},\underline{A}) - \underline{f}(\underline{x},\hat{\underline{A}}))\} \tag{16}$$

where $\Omega$ is a set of coordinates covering the entire image. To relate J to $\text{cov}\hat{A}$, $$J(S,\underline{A}) \approx \sum_{\underline{x} \in \epsilon} \text{trace}(\nabla \underline{f})^T B (\nabla \underline{f}) \tag{17}$$

with equality holding for polynomial models.

Simplification for polynomial models. If $\underline{f}$ can be modeled as a polynomial, then it is linear in $\underline{A}$ and its gradient (with respect to $\underline{A}$) $\nabla F$ does not depend on $\underline{A}$. That is, $\underline{f}$ is a polynomial in $(x_i, y_i)$ of the form $$\underline{f}(\underline{x}_i) = \begin{pmatrix} f_x \\ f_y \end{pmatrix} = \begin{pmatrix} \sum_{j=1}^{p_x} a_j x_i^{l(j)} y_i^{m(j)} \\ \sum_{j=p_x+1}^{p} a_j x_i^{l(j)} y_i^{m(j)} \end{pmatrix} \tag{18}$$

p is the length of A (i.e. the total number of parameters a in the model) and $p_x$ is the number of parameters pertaining to the x-component $f_x$ of the model. The corresponding terms in the gradient $\nabla F$ are $$\frac{\partial f_x}{\partial a_j} = x_i^{l(j)} y_i^{m(j)} \text{ for } 1 \leq j < p_x \text{ and 0 otherwise} \tag{19}$$

$$\frac{\partial f_y}{\partial a_j} = x_i^{l(j)} y_i^{m(j)} \text{ for } p_z \leq j < p \text{ and 0 otherwise} \tag{20}$$

Therefore, equation (17) holds with equality and B can b estimated independent of $\underline{A}$, allowing subarea selection using off-line computation on reference data alone.

After some manipulation, the optimization criterion becomes $$J(S) = \sum_{i=1}^{p} \sum_{j=1}^{p} b_{ij} r_{ij} \tag{21}$$

where $b_{ij}$ is the (i,j)th element of B, p is the length of $\underline{A}$ (i.e. the number of parameters a in the model), $$r_{ij} = \sum_{\epsilon = \Omega} \frac{\partial f_x \partial f_x}{\partial a_i \partial a_j} + \frac{\partial f_y \partial f_y}{\partial a_i \partial a_j} \tag{22}$$

and $(f_x, f_y)$ are the x and y components of $\underline{f}$.

The term $r_{ij}$, in effect, weights the parameter covariance terms according to their total contribution to pixel registration covariances. Those weights only need to be computed once for a specified image size and model order. The $b_{ij}$'s are recomputed for each candidate S.

A better understanding of the present invention may be gained from example, and several examples are presented below.

Example 1: Affine $\underline{f}$, N-by-N Image

The components of $\underline{f}$ may be written as $$f_x = a_1 + a_2 x + a_3 y \tag{23}$$

$$f_y = a_4 + a_5 x + a_6 y. \tag{24}$$

Then the partial derivatives are $$\frac{\partial f_x}{\partial a_1} = \frac{\partial f_y}{\partial a_4} = 1 \quad (25)$$

$$\frac{\partial f_x}{\partial a_2} = \frac{\partial f_y}{\partial a_5} = x \quad (26)$$

$$\frac{\partial f_x}{\partial a_3} = \frac{\partial f_y}{\partial a_6} = y \quad (27)$$

$$\frac{\partial f_x}{\partial a_4} = \frac{\partial f_x}{\partial a_5} = \frac{\partial f_x}{\partial a_6} = 0 \quad (28)$$

$$\frac{\partial f_y}{\partial a_1} = \frac{\partial f_y}{\partial a_2} = \frac{\partial f_y}{\partial a_3} = 0 \quad (29)$$

After collecting terms, the optimization criterion becomes:

$$J = (b_{11}+b_{44})N^2 + (b_{22}+b_{55})\bar{x}^2 + (b_{33}+b_{66})\bar{y}^2 + 2(b_{12}+b_{42})\bar{x} + 2(b_{13}+b_{46})\bar{y} \quad (30)$$

where $$\bar{x}^2 = \sum_{x\in\Omega} x^2, \quad (31)$$

$$\bar{x} = \sum_{x\in\Omega} x \quad (32)$$

and similarly for y.

Example 2: Pre-computed Weights for $\Omega$ Symmetric about the Origin, Unit Sample Spacing, Affine $\underline{f}$ Symmetry implies:

$$\bar{x} = \bar{y} = 0 \quad (33)$$

and unit sample spacing implies:

$$\bar{x}^2 = \bar{y}^2 = \int_{-N/2}^{N/2} x^2 dx = \frac{N^4}{12} \quad (34)$$

so that $$J = (b_{11}+b_{44})N^2 + (b_{22}+b_{33}+b_{55}+b_{66})N^4/12. \quad (35)$$

Equation (35) only involves the diagonal terms of B. Care should be taken to use the same units for the $\underline{x}$'s used in computing B and those used for pre-computing the inner sum.

Use of a priori parameter estimates. Suppose that we normally have initial estimates of registration parameters and could quantify the accuracy of those estimates or, at least bound their uncertainty. For example, in a second order polynomial model, one might know from operational limits on viewing geometry that the covariance of the quadratic terms are much smaller than that of all lower order terms. Then the criterion function (17) may inappropriately be dominated by the effects of the covariance for the quadratic terms. This can be systematically prevented by including an a priori covariance in the formulation, as described below.

Let the initial estimate be $\underline{A}_0$ with covariance $\underline{B}_0$. Then a Bayesian estimate $\tilde{A}$ of the parameters $\underline{A}$ is given by $$\tilde{A} = (B_0^{-1} + B^{-1})^{-1}(B_0^{-1}\underline{A}_0 + B^{-1}\tilde{\underline{A}})^{-1} = (B_0^{-1} + B^{-1})^{-1}(B_0^{-1}\underline{A}_0 + \nabla F^T C^{-1} \underline{X}')^{-1} \quad (36)$$

where $\underline{X}'$ is the actual measurement vector.

The same subarea selection procedure applies but with a simple modification: use of the covariance matrix:

$$\tilde{B} = cov\tilde{A} = (B_0^{-1} + \nabla F^T C^{-1} \nabla F)^{-1} \quad (37)$$

in place of B.

Example 3

Suppose that the covariance matrices are diagonal, $B_0 = diag(b_{0k}, k=1,\ldots,p)$ and $B = diag(b_{kk}; k=1,\ldots,p)$. Then (32) becomes $$J = (\tilde{b}_{11}+\tilde{b}_{44})N^2 + (\tilde{b}_{22}+\tilde{b}_{33}+\tilde{b}_{55}+\tilde{b}_{66})N^4/12 \quad (38)$$

with $$\tilde{b}_{kk} = \left( \frac{1}{b_{0k}} + \frac{1}{b_{kk}} \right)^{-1} \quad (39)$$

This places a limit on the influence of the kth parameter according to the following inequality:

$$\tilde{b}_{kk} < b_{0k}. \quad (40)$$

Synthesis of optimal subarea sets. Given the means for computing J, the problem is to synthesize sets of subareas that minimize J. The effect on J of eliminating or adding a subarea can be dependent on all other subareas, via $\nabla F$. Therefore combinatorial optimization is used for synthesizing the best S. If there are a total of $K_{tot}$ possible subareas from which to select the best K, a brute-force search would require $$K_{tot}!/(K_{tot}-K)!K! \quad (41)$$

evaluations of J. For typical values of $K_{tot}=1024$ and $K=16$, this would require over $10^{34}$ evaluations of J. Brute-force optimization is clearly not feasible.

However, efficient search procedures can dramatically reduce the computational requirements. Backtrack programming may provide a method to solve for the optimum subset as is described in "Backtrack Programming", by S. W. Golomb et al., in J. ACM, Vol. 12, pp. 516–524, October 1965. Two suboptimal solution approaches are described below that can reduce the cost to $O(K^2_{tot})$ or $O(K_{tot})$ evaluations of J. They are suboptimal because they do not include backtracking in the search procedure.

Procedure 1

Start with maximal set of subareas and eliminate those that minimize the increase in total MSE.

Initialization is accomplished by: (a) calculating downsampled information matrix images, (b) calculating $K_{tot}$= number of points in downsampled image. (c) look up or calculating covariance propagation weights r, (d) constructing $S_{Ktot}$, $t=\{1,\ldots,K_{tot}\}$, and (e) calculating $x_k$=position in original image of the kth point from the downsampled image. For $k=K_{tot}$ through K in increments of $K_{inc}$: (a) for every active subarea $i \in S_k$; calculate $J(S_k-i)$, and (b) deactivate the $K_{inc}$ active subareas with largest $J(S_k-i)$.

If $K_{inc}=1$, $J(S_k-i)$ is recalculated from scratch each time and brute force Gaussian elimination is used for calculating B, this procedure requires $O(p^3 K_{tot}^3)$ calculations where p is the number of registration parameters. Accelerated calculation where $K_{inc}=k/2$, i.e. half of the active subareas are eliminated at each step, reduces this to $O(p^3 K_{tot}^2 \log K_{tot})$. Recursive calculation of $J(S_k-i)$ reduces calculation by a factor of about $K_{tot}$. Efficient matrix inversion reduces this by a factor of p and, combined with the above savings, results in $O(p^3 K_{tot}^3) \log K_{tot})$ computational cost.

Procedure 2

Start with a minimal set of subareas and then add the subareas that maximize the reduction of total MSE. Initialization is accomplished by: (a) calculate downsampled information matrix images, (b) calculate $K_{tot}$=number of points in downsampled image, (c) look up or calculate covariance propagation weights $r_{ij}$, (d) calculate $\underline{x}_k$=position in original image of the kth point from the downsampled image, (e) For every subarea $i \in \{1, \ldots, K_{tot}\}$: calculate local MSE $tr(C_i)$, and (f) activate the $K_{min} \sim p/2$ subareas with smallest tr(Ci). For $k=K_{min}$ through K in increments of $K_{inc}$: (a) for every inactive subarea $i \epsilon S_k$: calculate $J(S_k+i)$, and (b) activate the $K_{inc}$ active elements with smallest $J(S_k+i)$.

Example 4

N-by-N SAR image with $N_{looks}$ looks averaged. If w is a rectangular window with area $$A_w = W^2 \qquad (42)$$

with $$W = \frac{64}{\sqrt{N_{looks}}}. \qquad (43)$$

The information images, after decimation, contain less than $$K_{tot} = [2N/W]^2 \qquad (44)$$

samples, depending on implementation.

Example 5

Design for 512-by-512 SAR image with 4 looks averaged. If $$W=32 \qquad (45)$$

$$A_w = 32^2 = 1024 \qquad (46)$$

$$K_{tot}[2 \times 512/32]^2 = 1024 \qquad (47)$$

and the desired number of selected subareas is $$K=16. \qquad (48)$$

Procedure 1 may be computationally prohibitive with the above parameters if, for example, $K_{inc}=1$. The previously-mentioned acceleration strategy selects a decreasing sequence where the number of active subareas is halved at each iteration. Specifically, $$K_{inc} = \{512, 256, 128, 64, 32, 16\}. \qquad (49)$$

Experimental Results

Procedure 2 was implemented and applied to SAR imagery. Four different sets (each selected by a different method) of twelve selected subareas superimposed on the reference image. These four test cases were: randomly selected subareas; minimization of local MSE $tr(C_i)$ alone; minimization of total MSE, translational model where $J=tr(B)=tr[(\Sigma_i C_i^{-1})^{-1}]$, and minimization of total MSE, scale factor model where $J=tr[(\Sigma_i \underline{X}_i^T C_i^{-1})^{-1}]$.

For the total MSE approach, criterion 2 was used in both cases. The start-up set was comprised of the single subarea with minimum tr(Ci). Then subareas were added one-at-a-time such that J was minimized.

The scale factor only model of f was as follows $$x'=a_x x \qquad (50)$$

and $$y'=a_y y. \qquad (51)$$

Although somewhat artificial, this model demonstrates that the accuracy of linear (and higher order) terms are influenced by position, and that this effect for a given parameter must be balanced against the competing demands of other parameters. The positions of selected subareas are distributed rather broadly in x and y and subareas are not placed near the center of the image because, according to the modeling assumption above, the position is known exactly at that point. The inclusion of translation and more linear parameters would of course result in a different layout of selected subareas.

Figure 5:
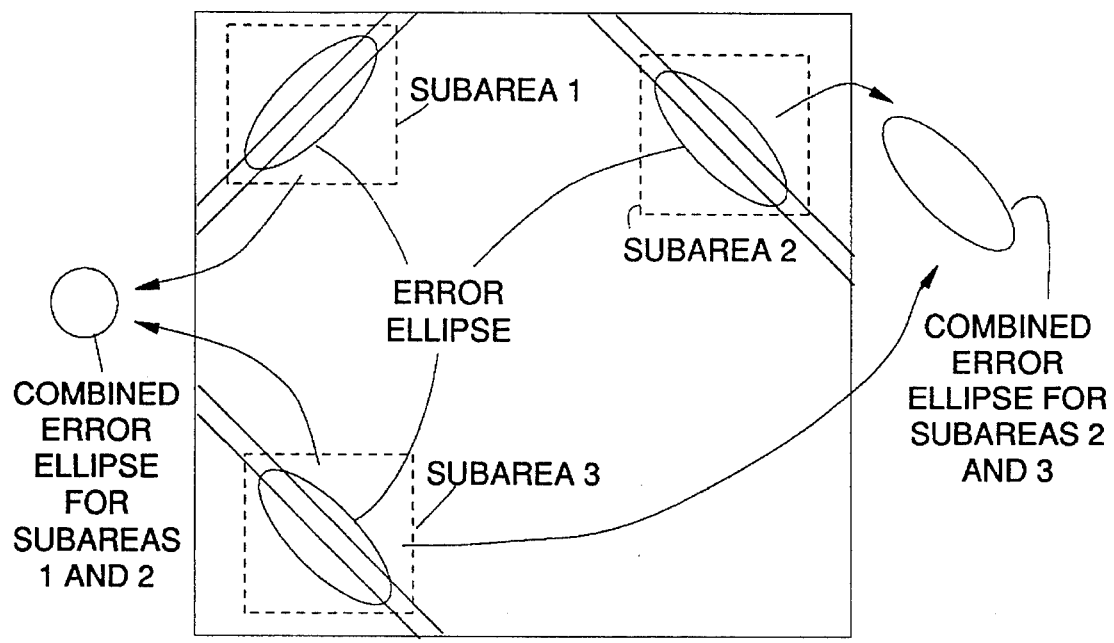
FIG. 5 shows an image with superimposed subareas, including rectangles that show the extent of the subareas that is useful in illustrating the advantages of the present invention.

The advantages of the vector approach of the present invention is illustrated by a simple example which will be described with reference to FIG. 5. FIG. 5 shows an image with superimposed subareas, including rectangles that show the extent of the subareas that is useful in illustrating the advantages of the present invention. Suppose that two of the three subareas are to be selected. A scalar measure of subarea quality, in accordance in the prior art, equally ranks each subarea and any combination of two subareas in this example. The present method 11 recognizes that the position error ellipse for a measurement derived from subarea 1 is complementary to those of subarea 2 and subarea 3. Therefore the present method 11 properly selects subareas 1 and 3 (or subareas 2 and 3) over subareas 1 and 2.

The selection criteria includes the vector quality (accuracy) metric for each subarea. It is important to include the vector measure of subarea quality, the covariance matrix rather than a scalar quality measure, to appropriately handle measurements that are of good quality, say, in x but not in y. The covariance matrix defines the error ellipse associated with a given measurement.

Selection criteria includes subarea position (jointly with subarea accuracy). For any transformation more general than pure translation, scale factor (magnification) or rotation for example, registration effectiveness depends on the relative positions of each measurement in addition to the accuracy of the measurements themselves. For example, moderately accurate measurements adequately dispersed in the image produce better results than highly accurate measurements clustered in one corner of the image. The present method 11 jointly considers subarea layout and covariance and therefore distinguishes between these cases. It can even handle the situation where the addition of a near-degenerate but well-positioned measurement is more effective than the addition of a highly accurate but poorly-positioned measurement. The selection criteria adapts to registration error model order. Also, the selection criteria adapts to relative uncertainty in registration error parameters.

Figure 6:
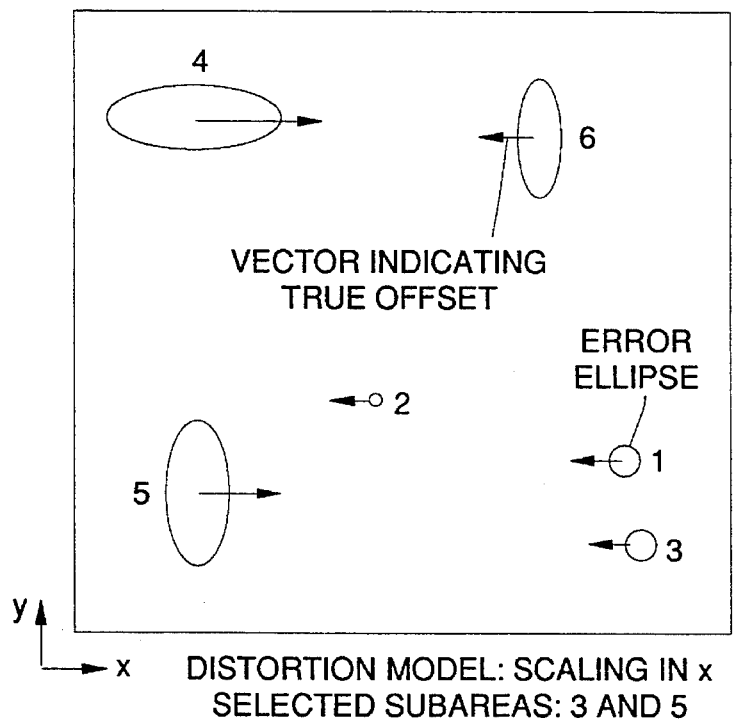
FIG. 6 shows an image that illustrates the importance of subarea layout and of coupling subarea layout, vector quality measures, and an uncertainty model, as is achieved by the present invention.

This advantage is illustrated in FIG. 6. FIG. 6 shows an image that illustrates the importance of subarea layout and of coupling subarea layout, vector quality measures, and an uncertainty model, as is achieved by the present invention. Suppose two of the six subareas are to be selected. For ease of exposition, a simple case is shown where the uncertainty model consists of a translation and scaling in the x direction only. The image registration procedure 24 estimates scaling by comparing two or more offsets measured at different places in the image. The present method 11 automatically selects subareas 3 and 5 because they are widely separated in the x direction and sufficiently accurate in the x direction. A procedure that does not consider layout would erroneously select subareas 2 and 3. One that considers layout but only scalar quality would erroneously select subareas 3 and 4.

The present method is very general and flexible. Experimental results indicate that it provides a significant improvement in accuracy (or on-line computation) over fixed or random subarea selection. The present method is especially valuable for second and higher order transformation models. The technique lends itself well to a number of extensions because of its generality.

Thus, there has been described automatic subarea selection methods for use in registering images. It is to be understood that the above-described embodiments are merely illustrative of some of the many specific embodiments that represent applications of the principles of the present invention. Clearly, numerous and other arrangements can be readily devised by those skilled in the an without departing from the scope of the invention.

What is claimed is:

1. A computer-implemented method for optimally registering a current image and a reference image to provide for detection of differences therebetween, said method comprising the steps of:

retrieving a reference image from a storage device;

processing the reference image to calculate an inverse covariance matrix for each of a plurality of image subareas of the reference image;

selecting a plurality of candidate image subareas from the plurality of image subareas based upon the relative values of the inverse covariance matrices for use in registering the current image to the reference image;

processing the plurality of candidate image subareas to generate a list of subareas that optimally register the current image;

processing the reference image to calculate covariance propagation weights for the reference image that are indicative of the error covariance between the reference image and the current image;

processing the reference image to calculate the covariance of polynomial error coefficients of each of the candidate subareas using a priori covariance of polynomial error coefficients and the calculated covariance propagation weights;

processing the list of subareas, the inverse covariance matrices, the covariance propagation weights, and the covariance of polynomial error coefficients to produce signals indicative of a set of reference subareas that are used to optimally register the current image;

selecting a set of subareas from the current image that correspond to the set of reference subareas;

correlating the selected set of subareas from the current image to the set of reference subareas to produce difference signals indicative of the difference in registration between the reference image and the current image; and outputting the difference signals to provide data indicative of the differences in registration between the reference image and the current image.

2. The method of claim 1 wherein the step of processing the reference image to calculate the inverse covariance matrix comprises the steps of:

calculating derivative images $I_i^x$ and $I_i^y$;

calculating or look up b and $A_w$;

estimating $s_n$;

for each Hessian term:
      calculating product of derivatives, $[I_i^x]^2$,
      filtering the product with window w, and
      downsampling by W/2, where W is the equivalent width of w; and for each point in the downsampled Hessian images, converting the Hessian term into the information matrix using equation (6).

3. The method of claim 1 wherein the step of processing the plurality of candidate image subareas to generate a list of subareas that optimally register the current image comprises the steps of:

calculating downsampled information matrix images;

calculating $K_{tot}$=number of points in each downsampled image;

determining covariance propagation weights r for the downsampled image;

constructing $S_{K_{tot}}$, t={1, . . . , $K_{tot}$};

calculating $\underline{x}_k$=position in original image of the kth point from the downsampled image; and for k=$K_{tot}$ through K in increments of $K_{inc}$, for every active subarea i∈$S_k$:
      calculate $J(S_k-i)$, and
      deactivate the $K_{inc}$ active subareas with largest $J(S_k-i)$.

4. The method of claim 3 wherein the step of determining covariance propagation weights r comprises the step of:

calculating the covariance propagation weights r.

5. The method of claim 3 wherein the step of determining covariance propagation weights r comprises the step of:

looking up the covariance propagation weights r.

6. The method of claim 1 wherein the step of processing the plurality of candidate image subareas to generate a list of subareas that optimally register the current image comprises the steps of:

calculating downsampled information matrix images;

calculating $K_{tot}$=number of points in the downsampled image;

determining covariance propagation weights $r_{ij}$ of the downsampled image;

calculate $\underline{x}_k$=position in the original image of the kth point from the downsampled image;

for every subarea i∈{1, . . . , $K_{tot}$}:
      calculating a local mean squared registration error tr(Ci); and
      activating the $K_{min}$~p/2 subareas with the smallest tr(Ci); and for k=$K_{min}$ through K in increments of $K_{inc}$, and for every inactive subarea i∉$S_k$:
      calculating $J(S_k+i)$; and
      activating the $K_{inc}$ active elements with the smallest $J(S_k+i)$.

7. The method of claim 6 wherein the step of determining covariance propagation weights r comprises the step of:

calculating the covariance propagation weights r.

8. The method of claim 6 wherein the step of determining covariance propagation weights r comprises the step of:

looking up the covariance propagation weights r.

9. A computer-implemented method for optimally registering a current real-time image to a reference image, said method comprising the steps of:

retrieving a reference image from a storage device;

filtering the reference image using a plurality of nonlinear filters to produce an inverse covariance matrix for each of a plurality of image subareas of the reference image;

processing the plurality of inverse covariance matrices to select a set of candidate image subareas based upon the relative values of the inverse covariance matrices for use in registering the current real-time image to the reference image;

processing the set of candidate image subareas to generate a list of subareas that optimally register the current real-time image;

calculating covariance propagation weights for the reference image using a predetermined uncertainty model, which weights are indicative of the error covariance between the reference image and the current real-time image;

processing the list of subareas, the inverse covariance matrices, and the covariance propagation weights to produce signals indicative of a set of reference subareas that is used to optimally register the current real-time image;

selecting a set of subareas from the current real-time image that correspond to the set of reference subareas;

correlating the selected set of subareas from the current real-time image to the set of reference subareas to produce difference signals indicative of the difference in registration between the reference image and the current real-time image.

10. The method of claim 9 further comprising the step of:

adjusting the orientation of the live image relative to the reference image so that they coincide.

11. The method of claim 9 further comprising the step of:

generating steering commands in response to the difference signals that direct a projectile at a target whose image corresponds to the reference image.

12. A computer-implemented method for optimally registering a current real-time image to a reference image, said method comprising the steps of:

retrieving a reference image from a storage device;

filtering the reference image using a plurality of nonlinear filters to produce an inverse covariance matrix for each of a plurality of image subareas of the reference image;

processing the plurality of inverse covariance matrices to select a plurality of candidate image subareas based upon the relative values of the inverse covariance matrices for use in registering the current real-time image to the reference image;

calculating covariance propagation weights for the reference image using a predetermined uncertainty model that is indicative of the error covariance between the reference image and the real-time image;

calculating the covariance of polynomial error coefficients of each of the candidate subareas using a previous covariance of polynomial error coefficients and the calculated covariance propagation weights;

calculating a total mean squared registration error for each of the candidate subareas in terms of position and predicted measurement covariance; and outputting a list of subarea positions derived from the total mean squared registration error that are used to correlate the candidate subarea& which correlated subareas are used to register the current real-time image to the reference image.

13. The method of claim 12 further comprising the step of:

detecting changes between the optimally registered current real-time image and reference image.

14. A computer-implemented method for guiding a vehicle toward a target using video imagery, and wherein a reference image corresponding to the target has been stored, said method comprising the steps of:

processing the reference image to determine the relative uncertainty in locating the actual position of an area of interest to provide selected subareas in the reference image that are optimal in registering the live image;

processing the live imagery using a subarea extraction procedure to extract subareas from the live imagery that correspond to the selected subareas;

correlating the selected subareas and the extracted subareas to provide output signals indicative of the error therebetween;

coupling the output signals to the vehicle to provide guidance signals thereto; and steering the vehicle in response to the guidance signals, which guidance signals optimally register the live image to the reference image that corresponds to the target.

15. The method of claim 14 further comprising the step of:

warping the live image relative to the reference image to optimally register the current image to the reference image for viewing by an operator of the vehicle.

* * * * *